(12) United States Patent
Wang et al.

(10) Patent No.: US 7,039,851 B2
(45) Date of Patent: May 2, 2006

(54) METHOD OF AND APPARATUS FOR CORRECTING ERRORS IN DATA PACKET FLOW STREAMS AS IN CLOSED RING SEQUENTIAL ADDRESS GENERATORS AND THE LIKE WITHOUT DATA FLOW STREAM INTERRUPTION

(75) Inventors: Xiaolin Wang, Concord, MA (US); Ajay C. Mahagaokar, Westboro, MA (US); Benjamin Marshall, Stowe, MA (US); Stephen E. Smith, Framingham, MA (US)

(73) Assignee: AXIOWAVE Networks, Inc., Boston, MA (US)

( * ) Notice: Subject to any disclaimer, the term of this patent is extended or adjusted under 35 U.S.C. 154(b) by 428 days.

(21) Appl. No.: 10/247,254

(22) Filed: Jun. 8, 2002

(65) Prior Publication Data

US 2003/0229839 A1    Dec. 11, 2003

(51) Int. Cl.
*H03M 13/00* (2006.01)

(52) U.S. Cl. ..................... 714/776; 714/775

(58) Field of Classification Search .............. 714/758, 714/777, 789, 784, 775, 814, 776, 703, 724
See application file for complete search history.

(56) References Cited

U.S. PATENT DOCUMENTS

| 5,379,415 A * | 1/1995 | Papenberg et al. ............ 714/5 |
| 5,805,614 A * | 9/1998 | Norris ........................ 714/776 |
| 5,812,556 A * | 9/1998 | Schmidt ..................... 714/703 |
| 6,587,294 B1* | 7/2003 | Ushio et al. .................. 360/53 |

* cited by examiner

*Primary Examiner*—Guy Lamarre
*Assistant Examiner*—Mujtaba Chaudry
(74) *Attorney, Agent, or Firm*—Rines and Rines

(57) ABSTRACT

A novel fault-tolerance technique for protecting against and correcting errors in packet data stream flow, preferably through not exclusively with closed ring sequential address generators and the like, through the use of pairs of independent but linked packet data flow paths enabling discarding of error data occurring in one path and substituting therefor corresponding correct data from the other path to enable continuation of the data stream flow without interruption and without error.

30 Claims, 12 Drawing Sheets

Super Packet for Each Queue

TM and AG Ring Connection

Connection Between two AG Rings

AG-AG Interface

De-Skew of TM Inputs

Return Addresses Arbitration Logic

METHOD OF AND APPARATUS FOR CORRECTING ERRORS IN DATA PACKET FLOW STREAMS AS IN CLOSED RING SEQUENTIAL ADDRESS GENERATORS AND THE LIKE WITHOUT DATA FLOW STREAM INTERRUPTION

FIELD OF THE INVENTION

The present invention relates most generically to the protection and correction of sequential data packet stream flow errors with novel redundancy techniques; being more particularly, though not exclusively, concerned with such errors arising in systems and techniques for assigning memory storage addresses to sequential data packets from pluralities of input data line cards, traffic managers (TM) or other sources. More specifically, the invention is directed to the electronic switch fabric (ESF) address generators (AG) of the closed ring sequential type described in copending U.S. patent application Ser. No. 10/026,166, entitled Method of Addressing Sequential Data Packets From A Plurality Of Input Data Line Cards For Shared Memory Storage And The Like, And Novel Address Generator Therefor, filed Dec. 21, 2001, such addressing being intended for writing the data packets into shared memory sections preferably of an output-buffered electrical switch fabric as of the type described in further copending U.S. patent application Ser. No. 09/941,144, entitled Method Of Scalable Non-Blocking Shared Memory Output-Buffered Switching Of Variable Length Data Packets For Pluralities Of Ports At Full Line Rate, And Apparatus Therefor, filed Aug. 28, 2001, both copending applications being of common assignee herewith.

BACKGROUND OF THE INVENTION

While the addressing methodology used in the practice of the invention may be of more general application as well, it will be illustratively described herein with reference to its preferred and best mode use with output-buffered electronic switch fabrics (ESF) of the above-mentioned type, wherein a central shared memory architecture is employed, comprised of a plurality of similar successive data memory channels defining a memory space, with fixed limited times of data distribution from the input ports successively into the successive memory cells of the successive memory channels, and in striped fashion across the memory space. This enables non-blocking shared memory output-buffered data switching, with the data stored across the memory channels uniformly. By so limiting the times of storing data from an input port in each successive memory channel, as explained in said copending applications, the problem is admirably solved of guaranteeing that data is written into memory in a non-blocking fashion across the memory space and with bounded delay.

Illustrative Preferred Electronic Switch Fabric (ESF) for Use with the Invention This preferred technique, embraces a method of receiving and outputting a plurality m of queues of data traffic streams to be switched from data traffic line card input ports to output ports. A plurality n of similar successive data memory channels is provided, each having a number of memory cells defining the shared memory space assigned to the m queues. Buffering is effected for m memory cells, disposed in front of each memory channel, to receive and buffer data switched thereto from line card traffic streams, and providing sufficient buffering to absorb a burst from up to n line cards. Successive data is distributed in each of the queues during fixed limited times only to corresponding successive cells of each of the successive memory channels and, as before stated, in striped fashion across the memory space, thereby providing the non-blocking shared memory output-buffered data switching I/O (input/output) ports. Each packet from an input port gets an address in the destination queue from an address generator, defining the location in the shared memory in which the packet will be stored. Such use of an output-buffered switch fabric enables packets destined for a queue to come from all input ports; and all these packets are written into the shared memory such that, as before mentioned, there is no overlap among packets and no holes or gaps between adjacent packets. The address of every packet, accordingly, depends upon all the packets that have been previously assigned an address, and the packets must be assigned sequentially. This parallel processing algorithm enables the address generator to be scalable for both port count and bandwidth.

As an example, the system embodying the shared memory operating with the address generating methodology of the present invention can support minimum 40 byte packets with no impact on the switch fabric performance, receiving from each 10 Gbps port, a 40 byte packet every 40 ns fixed time slot, and with capability to assign addresses for 64 packets every 40ns, as where all these packets belong to the same queue.

Illustrative Address Generator (AG) for Use with the Invention

With the use of the before-mentioned closed ring sequential address generators for the shared-memory output-buffered electronic switch fabric, the technique for addressing the sequential data packets received from a plurality of input data line cards to enable their memory storage in successive shared memory block sections of the output-buffered switch fabric, (each assigned to a queue dedicated for an output port), comprises connecting a plurality of similar subaddress generators successively in a closed ring structure, previously mentioned. Each subaddress generator is, as described in the first-named copending application, capable of assigning addresses for predetermined size data byte packets of input data traffic received in a plurality of successive time slots, to produce packet composition into so-called super packets that are ordered based on time of arrival. A continuous memory block is allocated for a super packet by assigning an initial super packet address in the destination queue from a subaddress generator, and thereupon generating the starting address of the next super packet by adding the super packet size to said initial starting address and moving to the next subaddress generator sequentially along the successive subaddress generators of the ring. This sequentially allocates memory in the shared memory sections from subaddress generator to subaddress generator along the ring. Upon the assigning of an address to each super packet, packet decomposition is produced at the corresponding subaddress generator by simultaneously assigning addresses for the individual packets in the super packet, based on their arrival order. All subaddress generators are operated to execute their respective said packet composition and packet decomposition concurrently, and the packets are written into the shared memory sections such that there is no overlap among the packets and no holes between adjacent packets, with said memory allocating moving to the next subaddress generator after an allocation time period of more than one time slot, and with said time period being proportional to the maximum size of a super packet. To support 640 Gbps input bandwidth with 40-byte packets, for example, the AG subsystem has to be capable of generating an address in 0.5 ns.

The Error Protection and Correction Redundancy Concept of the Present Invention

Illustrating the invention herein as exemplary applied to the above preferred shared-memory and output-buffered ESF and AG ring structure, it should be observed that the switch fabric is a highly distributed architecture comprised of several devices that play varying degrees of role as data path and control path elements. The AG, indeed, is the only centralized element in the ESF that primarily manages the control path via parallel computations to achieve the required bandwidth needed for writing data into the ESF shared memory element, as later detailed.

With the multiple AG units connected in a ring topology to scale-up the performance of the ESF, AGs in practice are co-located on a single board and pragmatically placed on a bandwidth management processor (BMP) card. Any error on the AG ring, however, can fester unhindered and cause serious problems with the ESF, leading to unreliable data that egresses one or more line cards. Without an automatic error recovery solution, system software will have to intervene and correct the problem by resetting in part or whole, the entire AG ring. Considering the number of high-speed feeds into the ESF, this can lead to loss of a significant quantity of data.

It is to the solution of such problems that the present invention is accordingly directed, providing a novel multiple AG ring redundancy system that allows the ESF automatically to correct the AG ring in face of errors on a per queue or on multiple AG level.

Objects of Invention

An object of the present invention, therefore, is to provide a new and improved method of and apparatus for protecting and correcting errors in data packet flow in closed ring address generators of the type particularly, though not exclusively, suited to enable packet addressing in an output-buffered shared memory ESF, and the like.

A further object is to provide a novel address generator redundancy system for carrying out the method of the addressing technique of the invention error-free, and embodying a pair of duplicate AG ring structures each of successively connected subaddress generators, with memory allocation of dataflow effected sequentially from subaddress generator to subaddress generator along the each ring path, and with the rings linked for increasing the reliability of the ESF, with each ring protecting the other from possible errors within each link.

Still another object is to provide such duplicate parallel data flow paths, linked to enable synchronization thereof, and with substitution and restoration of a correct data packet in one path for a corresponding erroneous packet in the other path, "on-the-fly", and which is of more generic use for real-time data error correction in parallel structures of data flow paths generically, other than ring structures.

Other and further objects will be explained hereinafter and are more particularly detailed in the accompanying claims.

BRIEF DESCRIPTION OF THE DRAWING

The invention will now be described with reference to the accompanying drawings.

SUMMARY OF THE INVENTION

In summary, however, from one of its important aspects, the present invention embraces in an address generating system for receiving address requests for a stream of data packet headers received by a traffic manager, the method of generating a corresponding stream of address data, that comprises, providing two identical but independently operated closed rings of successively connected and clocked address generators; synchronizing the operation of both address generator rings; applying the same received stream of data packet headers from the traffic manager to each of the address generator rings successively to generate requests for identical address data along each address generator ring and to return to the traffic manager identical address responses; linking the rings such that when address data arrives from an address generator at an end of the ring, it is stored to await the corresponding address data from the corresponding address generator of the other ring for comparison; in the event that such address data from one of the rings is in error and thus different from the corresponding correct address data from the other ring for comparison, discarding the erroneous address data and inserting the correct address data from the other ring in its place; and re-synchronizing the operation of both rings to enable continual real-time flow of the stream of address data corrected to substitute the correct address data for the erroneous address data.

Preferred embodiments and best mode configurations are later detailed.

DETAILED DESCRIPTION OF PREFERRED EMBODIMENTS OF INVENTION

Figure 1:
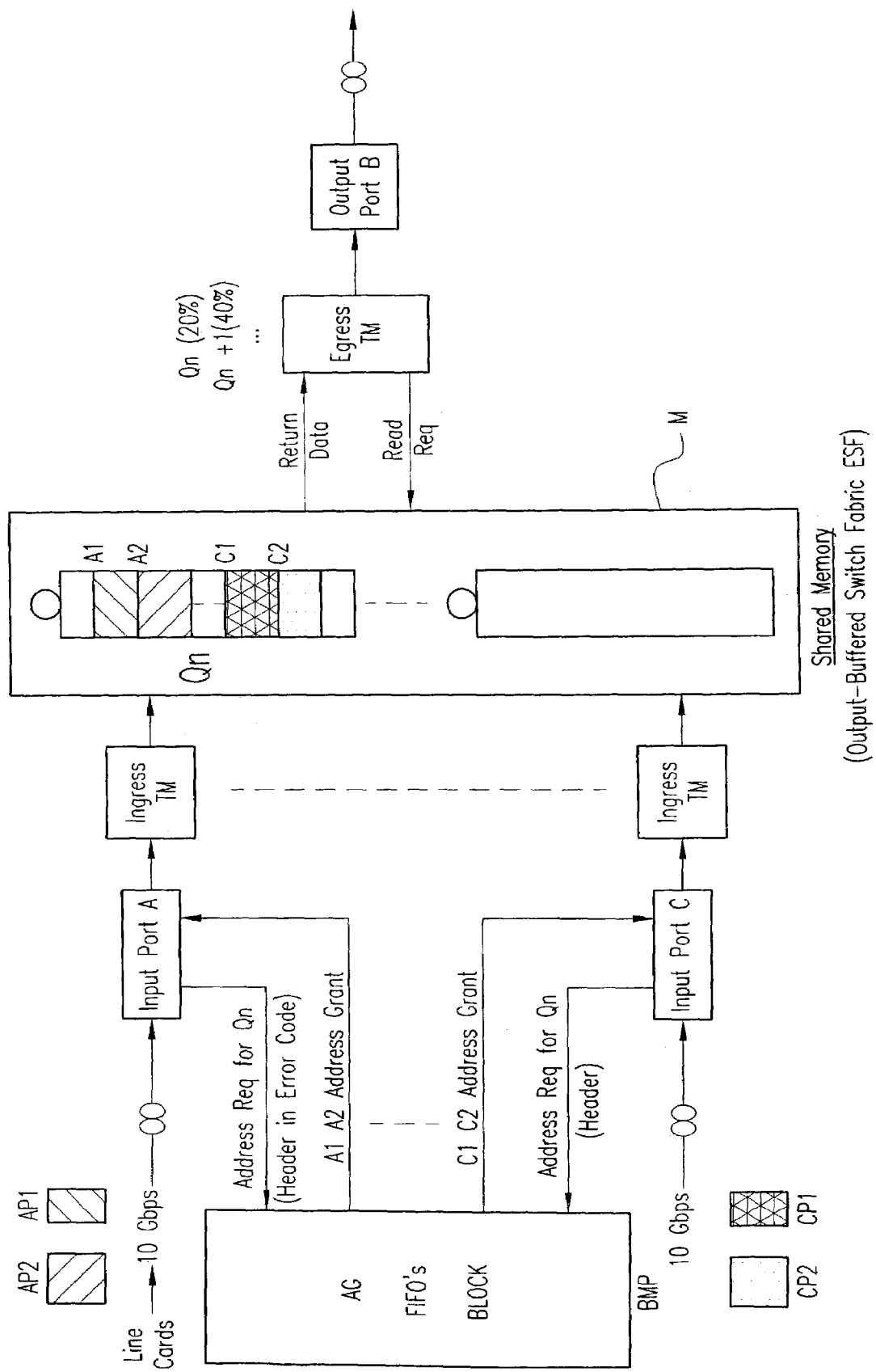
FIG. 1 of which is an overall block operational diagram of the preferred overall system of said copending applications, addressing generator for the before-described output-buffered shared memory switch fabric.

Referring to FIG. 1, an overall system (termed by applicants' assignee as "the Agora ESF"—electronic switch fabric—) comprises the before-described output-buffered shared memory of the second of the above-referenced copending application, shown at M, and connected to be addressed by the type of address generator system AGS preferred for use in the present invention. Before proceeding to describe the complete system, however, it is believed useful first to consider such basic address-generating.

Figure 2:
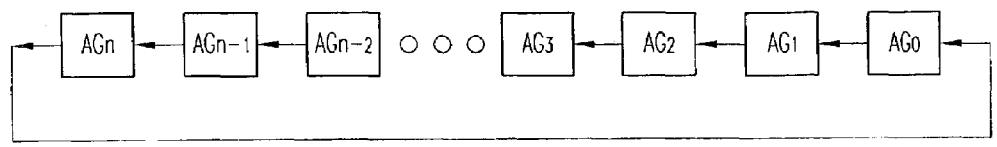
FIG. 2 is a diagram upon an enlarged scale of one of the address generator ring structure portions.

Basic Ring Structure AG of the First of Said Copending Applications Previously Referenced The before-described address generator ring structure of the address-generating system of the first of the earlier referenced said copending applications is illustrated in FIG. 2, having a plurality of subaddress generators $AG_o$ through $AG_n$ successively connected in a closed ring structure. For the previously described example, each subaddress generator will be capable of assigning addresses for, say, 40 Gbps of input traffic data from the line cards or other data packet sources.

In accordance with the technique of the invention, the entire address assignment is divided into three parts: Packet Composition, Memory Allocation and Packet Decomposition. Packet Composition (FIG. 3) constructs the incoming data packets into "super packets" in which the packets are ordered based on time of arrival. The Memory Allocation (FIG. 4) is a sequential procedure from subaddress generator to subaddress generator along the addressing ring. ($AG_O$ to $AG_1$ to $AG_2$, etc. in FIG. 2). This allocates the continuous memory block for a super packet by assigning a starting address, and generates the starting address of the next super packet by adding the current super packet size to that starting address—then moving to the next subaddress generator of the ring. Finally, Packet Decomposition (FIG. 5) assigns the address of each packet in the super packet based on the arriving order. All the subaddress generators of the ring execute the Packet Composition and Packet Decomposition functions concurrently.

Figure 3:
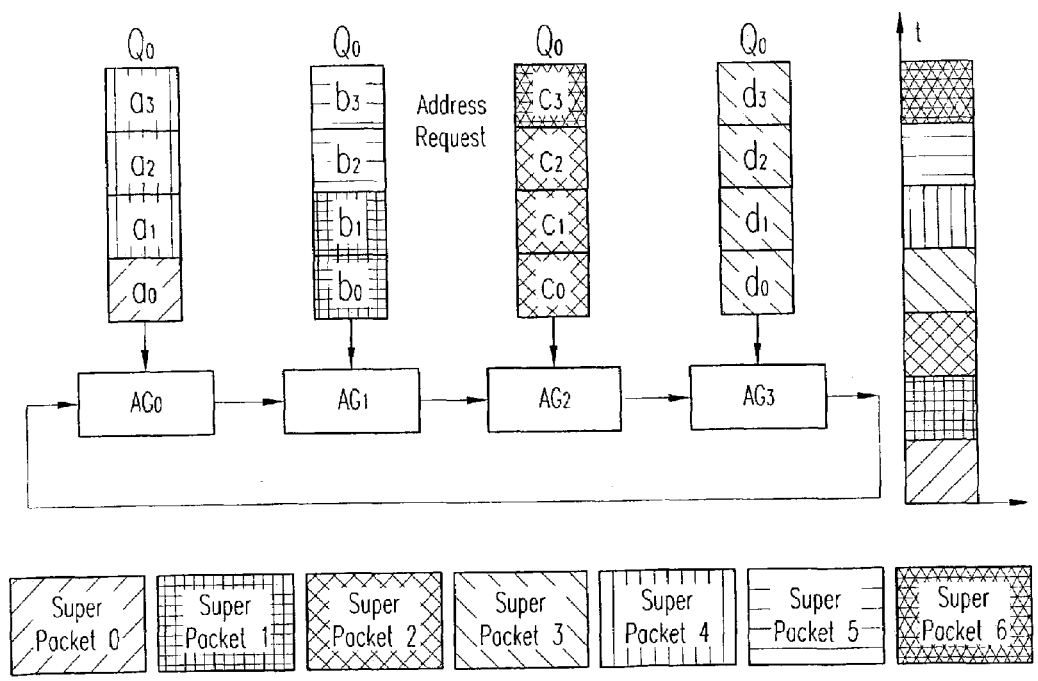
FIG. 3 is an explanatory diagram of the execution by all address generators of the ring structure of FIG. 2 of a packet composition functioning for a single queue, wherein the before-mentioned super packets are composed or constructed of received data packets, ordered based on time of arrival.
Figure 4:
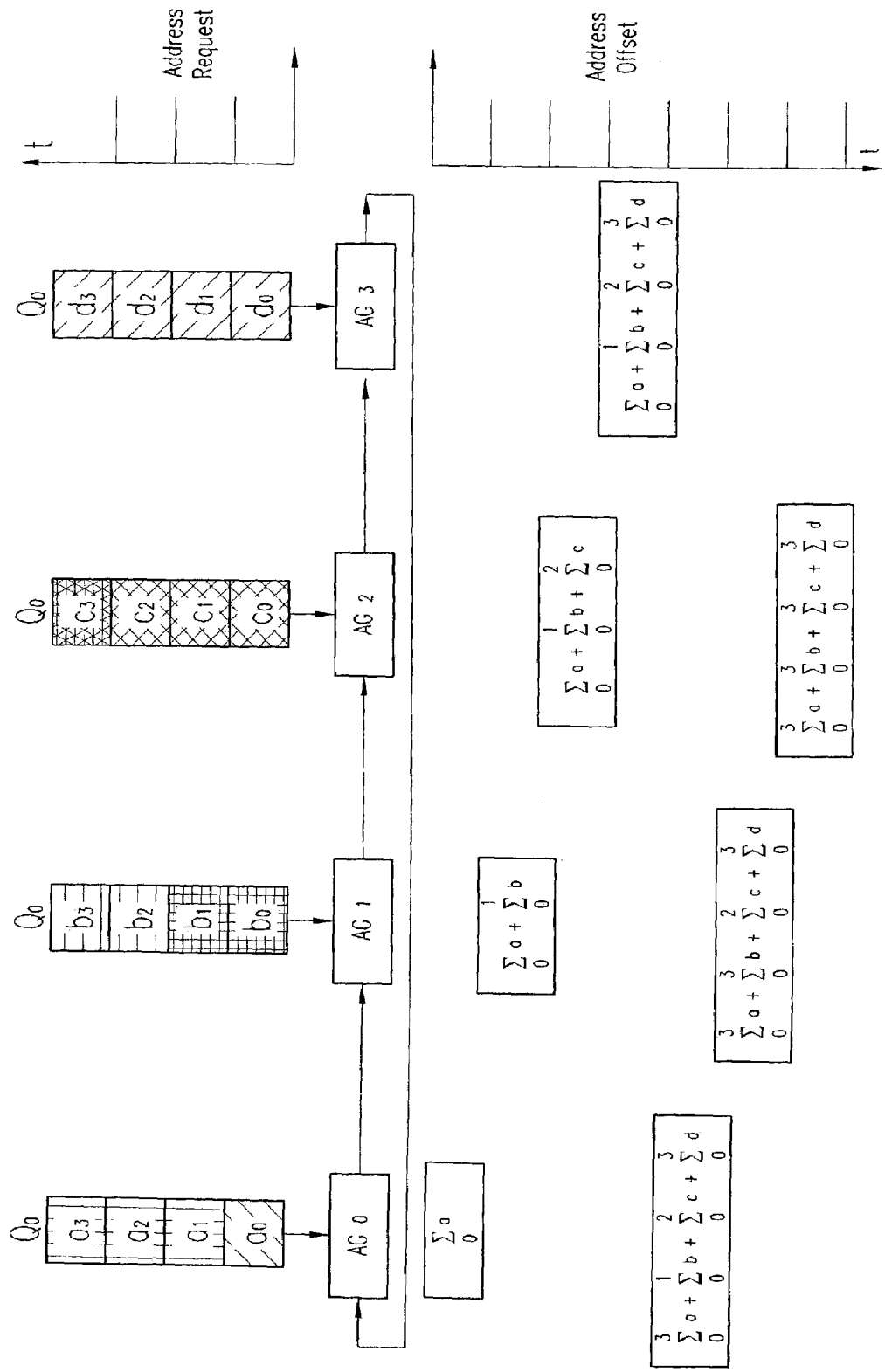
FIG. 4 shows the memory allocation assignment of memory space for each super packet, illustrating the adding of the super packet size to the previous super packet address for use as the starting address when the memory allocation moves to the next subaddress generator, as described in the first-named copending application, the upper part of the diagram showing address requests, and the lower part, summation expressions illustrating the address offset pathsed to the next stage at successive time slots.
Figure 5:
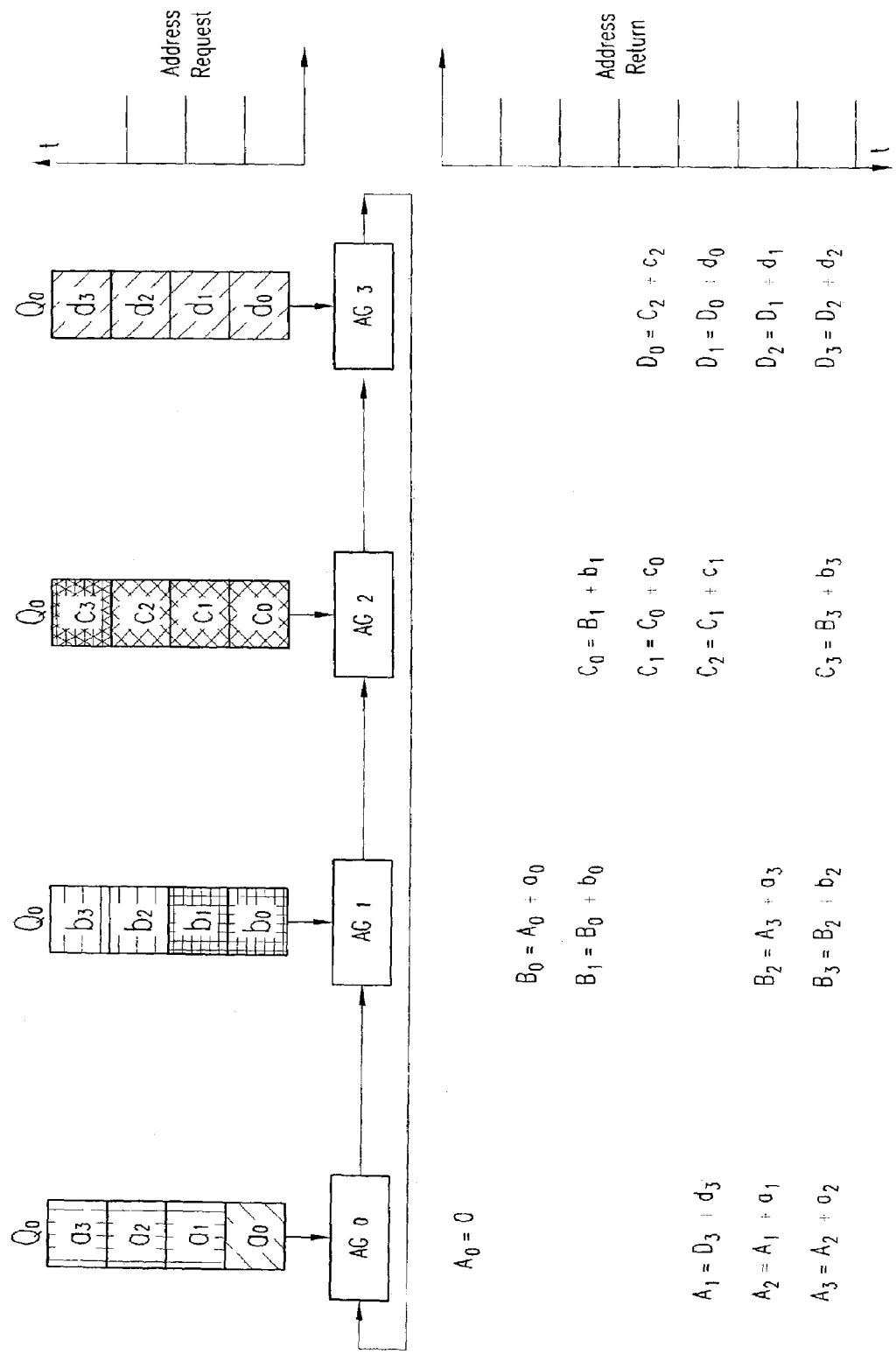
FIG. 5 is a similar diagram of a packet decomposition function of each subaddress generator, assigning addresses for individual packets in the super packet simultaneously, once the starting address for a super packet has been assigned by a subaddress generator.

As an example, contained in the first-named of said copending applications, consider the four subaddress generator rings $AG_O$, $AG_1$, $AG_2$, and $AG_3$ of FIGS. 3–5, in which each subaddress generator receives a new packet within address requests in four consecutive fixed time slots represented by respective composed or constructed super packet blocks $a_0$, $a_1$, $a_2$, and $a_3$; $b_0$, $b_1$, $b_2$, and $b_3$; $c_0$, $c_1$, $c_2$, and $c_3$; and $d_0$, $d_1$, $d_2$, and $d_3$; in the queues $Q_o$. Referring to the time graph ("t") at the right in the figures, the Packet Composition and Memory Allocation function of FIGS. 3 and 4 starts from subaddress generator $AG_O$ At time slot O, only one packet has shown up on subaddress generator $AG_O$, so the super packet contains only one packet. At time slot 1, each subaddress generator has received two packets, shown differentially shaded, composing or constructing the super packet. With the Memory Allocation starting from subaddress generator $AG_O$, when each subaddress generator receives said two-packet super packet, the Memory Allocation moves to subaddress generator $AG_1$, FIG. 4. As Memory Allocation moves along the address generator ring of FIG. 2, the packets that thus far are not yet in any super packets, form a new super packet—each super packet being shown with different shading. Thus Memory Allocation assigns memory space for each super packet. In this example, it assigns address 0 to super packet 0 and then adds the super packet size $a_o$ to the starting address, which is going to be used as starting address when Memory Allocation moves to the next subaddress generator. Specifically, at the before mentioned time slot 1, Memory Allocation moves to subaddress generator 1 and assigns a starting address, $$\sum_0 a,$$

to the super packet shaded in FIG. 3. It then adds the super packet size, $$\sum_0^1 b,$$

to the starting address, $$\sum_0 a,$$

forming the starting address for the next subaddress generator. Every time slot, it moves to the next subaddress generator along the address generator ring, adding the super packet size to the starting address as the starting address of the next subaddress generator, as earlier mentioned. The figure therefore shows Memory Allocation for each subaddress generator for each time slot, and the starting address for the next subaddress generator.

Every time slot along the vertical time axis t, it moves to the next subaddress generator along the address generator ring. The summation blocks illustrate which subaddress generator is performing the memory allocation in each time slot, and the corresponding starting address for the next address generator.

As before stated, the Packet Composition of FIG. 3 and the earlier described Packet Decomposition of FIG. 5 occur concurrently. Turning, therefore, to the Packet Decomposition, as shown in FIG. 5, once the starting address for a super packet is assigned, Packet Decomposition at each subaddress generator assigns addresses for the individual packets in the super packet simultaneously. In this example, a lower-case letter ($a_o$, $b_o$, etc.) represents the packet and its size as before described, and the corresponding capital letter ($A_o$, $B_o$, etc.) is used to represent in FIG. 5 the address assigned to the individual packet of the super packet. The starting address of the first super packet in such address generator $AG_O$ is $A_o=o$, assigned to it as the only packet $a_o$, in this super packet and Packet Decomposition. The starting address $A_1$ of the second super packet in $AG_0$ is shown as $A_1=D_3+d_3$ which is assigned to packet $a_1$. The starting address, plus the packet size of al will be the address $A_2$ of the next packet $a_2$ in the same super packet, namely, $A_2=A_1+a_1$, and so on. Each packet of each super packet will get a unique address such that no two packets overlap and no holes or gaps will exist in the shared memory assigned between adjacent packets.

In the algorithmic philosophy thus far described, the Memory Allocation has moved to the next subaddress generator in the ring, every time slot. This, however, is not a requirement since the Memory Allocation period—i.e. the time between two continuous memory allocations at a subaddress generator—is proportional to the maximum size of a super packet. This property makes the parallel processing of address generating of the invention possible and the system scalable in terms of port or subaddress generator count. The latency from packet arrival to address return, however, will increase with the subaddress generator count.

Figure 6:
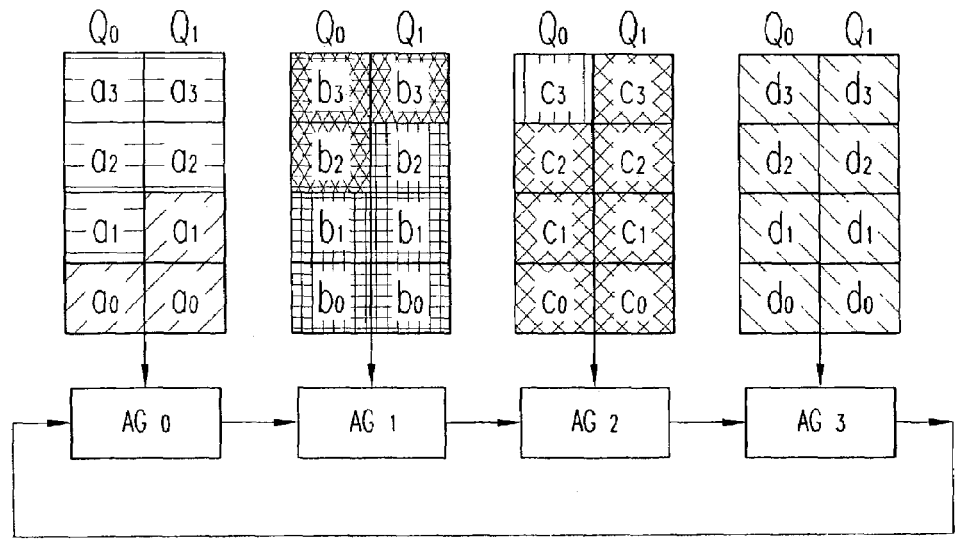
FIGS. 6, 7 and 8 correspond, respectively, to FIGS. 4, 3 and 5, showing memory allocation for a multiple (two) queue system with address offset pathsed to the next stage (FIG. 6), packet composition of a two queue system (FIG. 7), and packet decomposition (FIG. 8) of such a two queue system, respectively.
Figure 6:
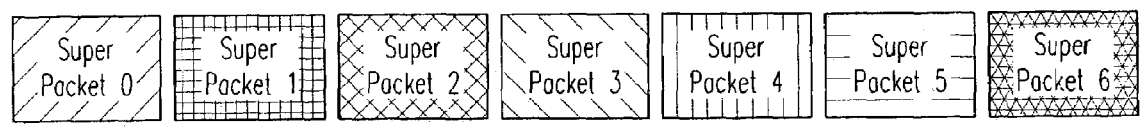
Figure 7:
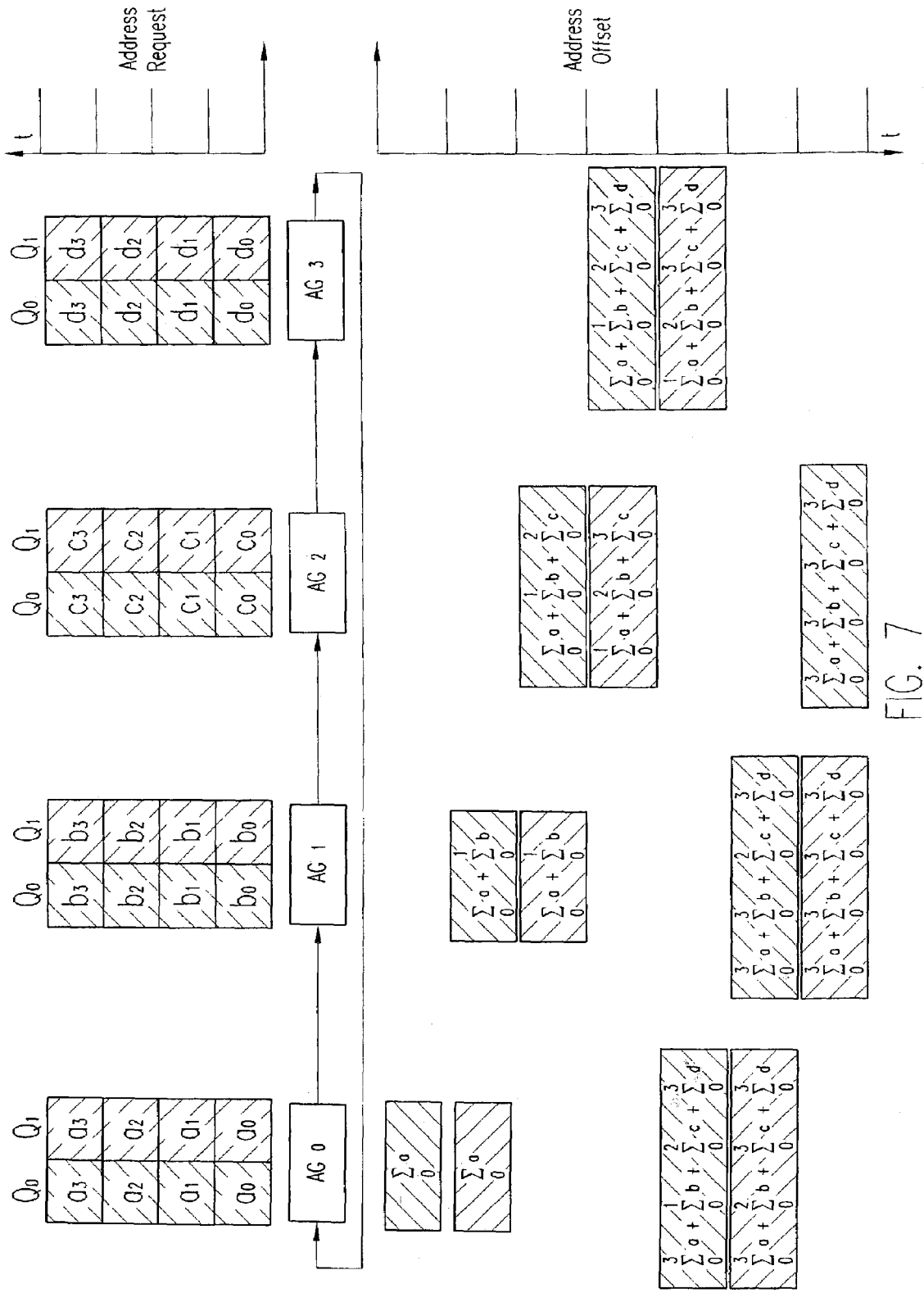
Figure 8:
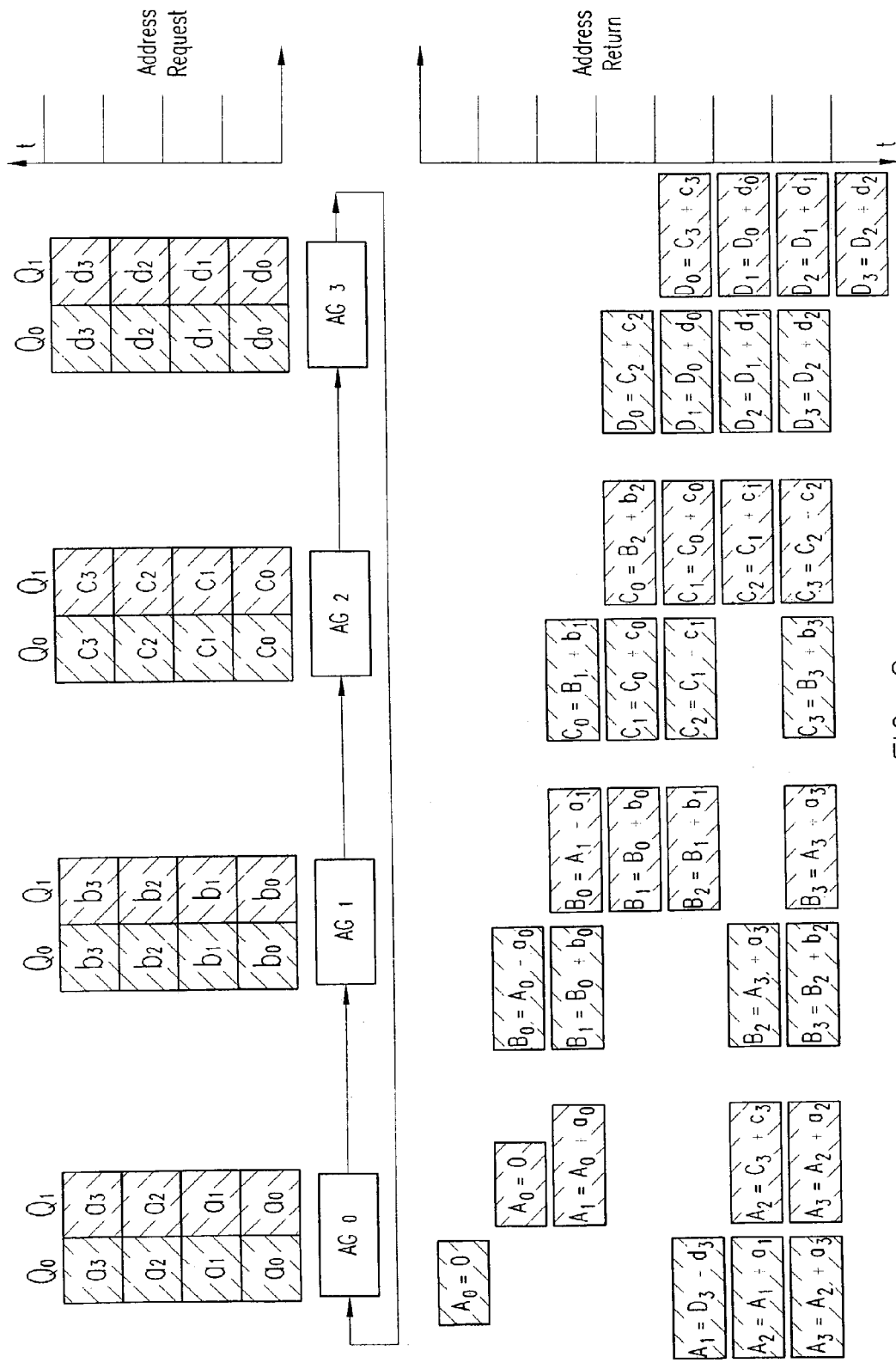

The previously described operation, furthermore, has been illustrated for the case of single queue $Q_0$ for Packet Composition and Packet Decomposition. As before indicated, however, multiple queue systems may also be similarly used, FIGS. 7, 6, and 8 showing Packet Composition, Memory Allocation and Packet Decomposition respectively for multiple queues-in this illustration, a two-queue system illustrating the same algorithmic approach as for the single queue systems of respective FIGS. 3, 4 and 5, detailed above. Many identical address generators may, indeed, be used, each corresponding to a data queue and each starting at different time slots.

In the illustrative two-queue system ($Q_0$, $Q_1$) of FIGS. 7, 6 and 8, the input pattern to each queue will be identical to the previously described operation. The Memory Allocation of FIG. 6 starts with $Q_0$, at time slot 0, and $Q_1$, (differently shaded) at time slot 1. While, moreover, the input pattern of both queues is identical, the super packets of each queue will be different as more particularly shown in FIG. 7. As for the Packet Decomposition of such a multiple queue system (FIG. 8), the method of assigning addresses to the individual packets of a super packet will be the same as described in connection with FIG. 5 for the single queue system. The use of more queues, of course, will result in a larger Memory Allocation period. This, of course, implies that the maximum size and packet and address-assignment latency will increase. In the approach of the method of the invention, as earlier noted, the rate of Packet Decomposition, however, has to match the rate of Packet Composition.

The Use of the AG Ring Structure with the Preferred ESF of the Second-Named Copending Application Referenced Above It is now in order to treat with the overall architecture of the address generating system AGS of the invention addressing the before-described preferred non-blocking shared memory output-buffered data switching system M, as of the type of said second-named copending application and represented in FIG. 1. For illustration purposes, two input or ingress ports A and C are shown at the left, with received data packets to be sent to the output or egress port B at the far right. Qn and Qn+1 queues in the shared memory M are illustratively shown dedicated to the output port B.

In operation, illustrative received packets AP1 and AP2 arrive from line cards sequentially at input port A. These packets are destined for queue $Q_n$ in the shared memory dedicated to output port B. The independently received illustrative packets CP1 and CP2 arrive sequentially at input port C, destined for queue Qn in the shared memory. The input port A makes a request for an address to the address-generating system AGS, earlier described, for illustrative packets AP1 and packet AP2, as described in said first-named copending application.

Similarly, ingress port C makes request for an address to AGS for packets CP1 and CP2. These packets AP1, AP2, CP1 and CP2, etc. can be of different sizes.

The address requests can happen simultaneously or in any order, and the address generator AGS processes these requests from port A in the required time and generates addresses A1 and A2 for input port A in the manner before detailed, and processes the requests from port C also in the required time, generating addresses C1 and C2 for input port C.

The addresses A1, A2 are returned to input port A and the addresses C1 and C2 are independently returned to input port C and this can happen in any order. Packets AP1 and AP2 which are waiting at input port A to get their addresses now travel to the shared memory M with their corresponding address tags of A1 and A2; and similarly, Packets CP1 and CP2 which are waiting at port C to get their addresses, now travel to the shared memory with their corresponding address tags of C1 and C2. The shared memory system carries these packets in non-blocking fashion and these packets are stored in queue Qn dedicated to output port B, completing the write operation of packets into the shared memory as more fully detailed in said copending applications.

The addresses A1, A2 and C1, C2 need not be contiguous addresses in Qn since there can be packets from other input or ingress ports that may occupy the regions between A1, A2, C1, C2. The output or egress port B is programmed to drain queue Qn based on its bandwidth allocation—20% as illustrated in this example of FIG. 8. According to this rate, the output port B makes a data request for data from queue Qn and the shared memory subsystem M returns appropriate data from queue Qn in appropriate time to the output port B. Other egress ports may also be active simultaneously with the shared memory handling of all these read requests appropriately. In due time, packets AP1, AP2, CP1, CP2 are drained out by the output port B, completing their intended travel from input ports A and C to output port B as per allocated bandwidth of Qn for output port B. This system performs these operations for 64 OC-192 in current experimental implementation of the assignee of the present invention, but the scheme, as before explained, is scalable with existing semiconductor technology and to more than 64 OC-192 ports.

The Effects of Errors Occurring Along the AG Ring Structure Path—The Problem Underlying the Present Invention Since each AG sub-system is thus the heart of the operation of the ESF, if this computation block were to encounter a debilitating data error, the entire ESF would become paralyzed. Even worse, a single transient data error could propagate along the ring to all sub address generators. It is to meet this challenge of the system requirements as carrier class equipment, that the present invention proves an address generator sub-system that is now fault-tolerant.

This is achieved through the use of a pair of parallel identical AG data flow ring structures appropriately redundantly linked and with synchronizing capability as later fully detailed for protection against data error and restoration to the data flow of correct data.

As earlier mentioned, a number of AGs are connected together in a ring topology, FIG. 2, and each performs independent parallel operations anchored by shared data, which is the write offset for each queue—each AG using this shared data and augmenting it by the amount it needs, and sending the result to the next AG in the ring. This ring is viewed as an atomic structure that needs to be protected by a peer. Conveniently, in practical implementation of the overall ESF, the AG ring is located on an earlier mentioned BMP card of which there are two such cards protecting each other. There are therefore two identical address generator rings in an "Agora ESF" and the two AG rings are fortuitously available for the redundancy or fault-tolerant solution the present invention.

Figure 9:
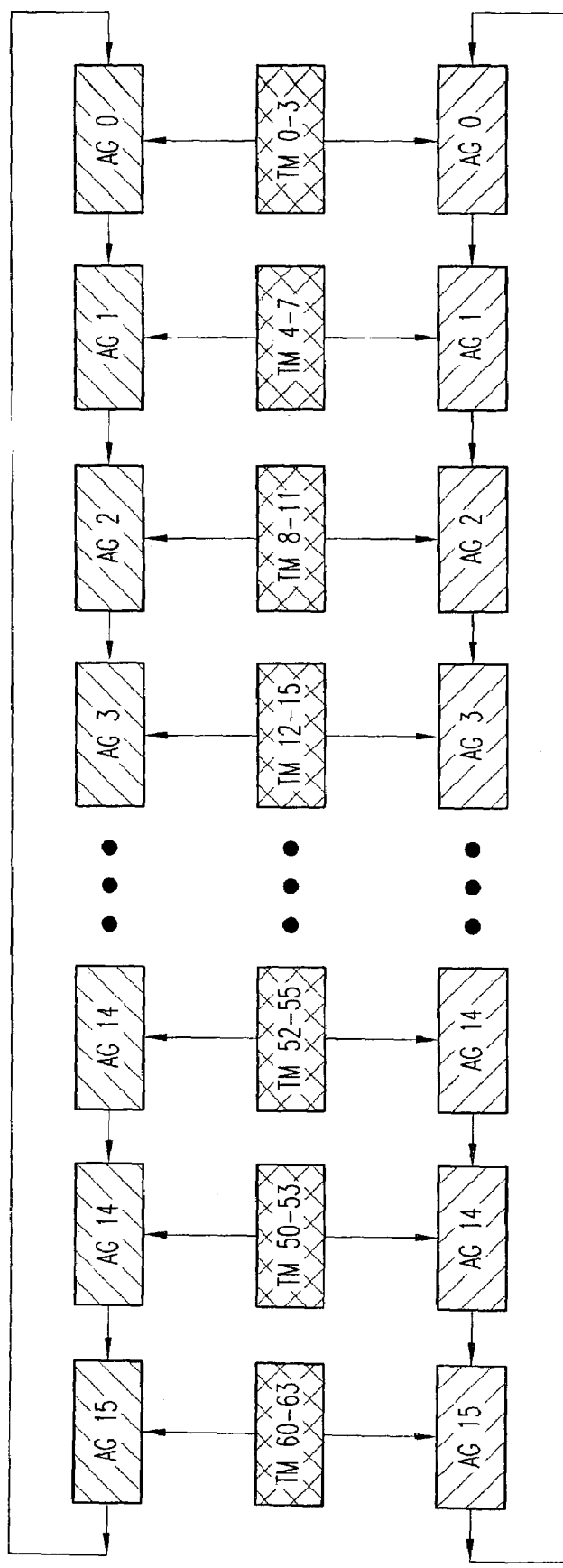
FIG. 9 illustrates a pair of parallel AG ring structure data flow paths of the type of FIG. 2 showing, for purposes of the present invention, the basic interconnect between the AG rings and the traffic managers TM.

The question arises, however, as to how to use the two parallel rings to increase the reliability of the ESF, which has only one central control element to it—the AG ring-and therefore the most critical element to be protected. FIG. 9 shows the basic interconnect between the upper and lower parallel AG rings and the before-mentioned traffic managers TM, also shown in FIG. 1. Each TM is shown symmetrically connected to one AG in each ring in FIG. 9, and these AGs also happen to be in the same position on each ring.

Figure 10:
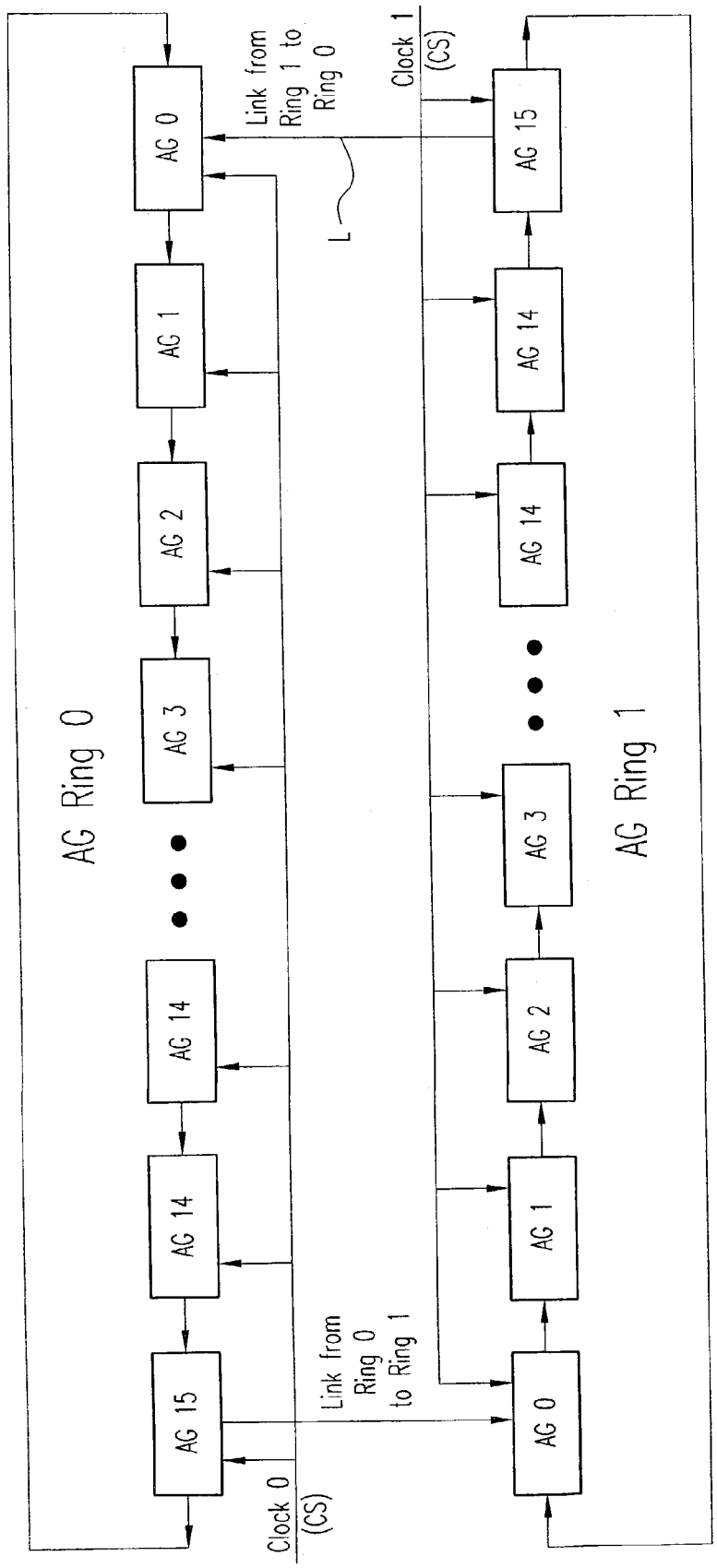
FIG. 10 shows a preferred control linking between the pair of AG rings.

In order to provide the extended capability to synchronize the two parallel AG data flow path rings, the invention provides a control link between the upper and lower AG rings. As shown in FIG. 10, the two AG data flow rings have been symmetrically converged or interconnected to each other such that the output of AG-15 in each ring is connected or linked to the input of AG-0 in the other ring at L, the AG synchronization link.

When a traffic manager TM receives a packet header from the data line card, it sends an address request, FIG. 1, to each of its address generators, and in each AG ring as shown in FIG. 9. If the system is perfectly synchronized (as more fully later discussed), a TM then expects to receive the same address data for each request in the same order from each of the two corresponding AGs with bounded time skew. If a ring has been initialized and enabled into service, it will always reply to such an address request from a TM with a data address response. Enclosed within such address response, the AG indicates to the TM by the error decision code in the data packet header, later more fully discussed, whether the response is valid or not. The TM is programmed, in accordance with the invention, to handle the following possible cases:

1. In case both responses are correct and identical, the TM can choose either one without issue.
2. If either of the two responses is correct, the TM will use that one.
3. If both responses are in error or incorrect, the TM will drop the data packet (and account it in statistics).
4. It is a fatal system error if both responses are correct and not identical because, as is explained later, this would suggest a logic error within the AG.

The above strategy assumes that the system is perfectly synchronized; this then is the central problem to be solved—how perfectly to synchronize the two rings. In fact, this problem can be stated as residing (1) in synchronization of the AG rings so that each AG ring has an identical view of memory allocation to the extent that, for the same data packet, each ring should assign the same address in the memory, (AG ring synchronization); and (2) in synchronization of the TM to each AG ring to insure that each data packet is accepted by each AG ring in the same "super packet" frame (address request synchronization).

If, accordingly, perfect synchronization is achieved as to the two AG rings and each TM to both AG rings, then, the two AG rings will produce the same data address for the same data packet. The following conditions must be met to ensure that the two AG rings do produce the same data address for each packet:

1. For each queue, the number of packets accumulated in the before-described super packet and the sequence order of individual packets in that super packet has to be the same in the corresponding AGs in each ring
2. The order in which an offset of a queue travels through corresponding AGs and the value of that offset has to be the same on both AG rings. If, indeed, the starting address assigned to the accumulated packets in the two corresponding AGs are the same and they both satisfy both of the above conditions, then each packet will get the identical address from corresponding AGs.

It is now in order, with such perfect synchronizing of the AG rings to each other and the TMs to each AG, to address the various error conditions that can lead to loss of such synchronization.

Error Classification

In any electrical system, there are two kinds of errors—static errors and transient errors. Static errors, such as power failure or a wire short, have constant effects, while a transient error, such as cross talk, happens only under certain conditions and is fleeting. If left uncorrected, however, a transient error can cascade into a very severe error or malfunction. The ESF address generator sub-system protection and restoration mechanism of the present invention provides assistance in detecting static errors while also correcting transient errors.

In the presence of protecting rings, a static error in an AG ring will require that the BMP card containing, say, a broken AG ring, be replaced without interrupting normal operation; and a transient error in an AG ring will trigger the mechanism described herein automatically to synchronize the two AG rings.

In the redundant ring solution of this invention, static error in an AG Ring is also protected by the same solution offered by managing the transient errors—types of error that the invention must correct.

Each AG-ring (on different BMP cards) and the TMs (on switch cards) are driven by the different clock sources schematically shown at CS in FIG. 10. These may be clocks of different or of substantially the same frequency. Although all these chips may be clocked at the same nominal rate, component variations or board design issues may cause frequency and timing skew, which can lead to loss of synchronization. Since different oscillator devices provide the clock source CS to the AGs and the TMs, their operating frequency can be different by a small, but finite amount, but the data flow along the two ring paths, however, will be at different speeds. If not compensated continuously, this can lead to cumulative errors that can cause loss of both AG ring synchronization and address request synchronization and re-synchronization. Since, moreover, different chips may be at different physical distances from the clock source, a timing skew may also exist between them. Again, if not compensated continuously, this can lead to cumulative errors that again can cause loss of both AG ring synchronization and address request synchronization.

Since in this illustrative embodiment of the invention there are only two rings, it is not possible to allow one ring to determine fairly if the other ring is in error. Instead, the premise of the solution of the present invention is for each AG to be independent and "mind its own business" and detect its own error. Assuming no logic error within the AG, a dynamic transient error is due to data corruption on any of three link types—AG-AG, AG-TM, ring-ring. All these links are protected b error detection code, such as the cycle redundancy code CRC-4 type Error Detection Code. CRC-4 can detect 1-bit error 100% of the time and 2-bit error 100% of the time if payload is 15 bytes or less. This allows the devices (AG and TM) to detect 1-bit error 100% of the time and 2-bit errors almost 100% of the time. The errors on these links can be classified as follows.

First, as a data corruption on the TM->AG link that will result in an address request loss error. This is a serious error and it can happen on one link and not the other, resulting in the rings getting out of step with one other with respect to the pertinent queue. This problem is solved by providing detection and correction capability in the AG as later detailed.

Secondly, data corruption on the AG->TM link will result in address response loss error. This is not, however, a very serious problem in a protected system, since the pertinent TM will get a valid response from the other ring (FIG. 9) and has no reason to belabor the errored response (other than maintaining statistics). The AG that sent the response that was corrupted, furthermore, is unaffected because it was an AG->TM link error, so there are also no consequences on the ring data corruption on the AG->AG link, called a ring error, that can lead to error in offsets of all members of the offset group (currently, designed as four queues). The AG that detects this condition must store this status for the appropriate queues and relay it to the next AG, after marking all offsets in the offset group as error offset. Thus, the next AG will be made aware of the error while it may not have actually "seen" the transient data corruption. Once again, this AG stores the error status corresponding to the pertinent queues and forwards this information to the next AG. In this manner, the shared data on the ring is updated with the error status. Now, any AG that has this error status stored for a queue will return the address response to its TMs, but with the response marked as "bad address". This way, the TM will discard the incorrect address and in substitution (and real-time) take the correct one from the other ring. Re-synchronization of the rings then allows the error-free data flow to continue.

The above discussion shows, however, that a data error can cause the errored ring to get out of step with the other ring in so far as the pertinent queues are concerned. The ring synchronization of the present invention can correct this error, too, as will also later be more fully explained.

Finally, data corruption can occur on the synchronization link called "Sync Link" error. This is not considered a serious error, however, because the receiving link will simply ignore the data and wait for the next update for the same queue.

It is now in order to explain in more detail the synchronization mechanisms of the invention that support multiple clock sources with, for example, the same nominal clock rate for the switch cards and the two AG rings and that handle all the transient error conditions discussed above. The AG ring synchronization is primarily achieved using the AG SyncLink structure L shown in before-mentioned FIG. 10. The time required to achieve ring synchronization is directly dependent on the number of synchronization links (e.g. one SyncLink between every fourth AG etc.) and the bandwidth of each link. In this section, we assume a pair of synchronization links L as described above, and minimum bandwidth of each synchronization link to be 5 Gbps of raw bandwidth. This allows transferring a write or read offset in a single clock cycle.

On the AG ring, a group of four read and write offsets is protected by the before mentioned CRC-4. The size of the offset group, for example, is 16 bytes and therefore the CRC can detect 1-bit errors 100% of the time and 2-bit errors almost 100% of the time as earlier explained. An AG transmitting an offset group generates the CRC-4; and the receive side computes the CRC-4 on the offset group and checks it against the received CRC for the offset group. Additionally, there is a valid bit associate with each offset. Thus, any single bit error is always detected on the ring. This means that the AG has the capability to detect ring errors.

The main information transferred by the AG rings over the AG synchronization link is the read and write offsets for any queue. Typically, this information is sent as a part of an offset update frame, in which each AG ring updates the other of its read/write offsets for each queue. Each offset update frame may, for example, consist of 32-bit words and starts with a frame header, followed by one-fourth of the total number of offsets and with a few cycles reserved for transferring of synchronization parameters, such as the seed for pseudo random number generation (if desired). A 32-bit offset-word on the AG synchronization link, for example, contains three fields—a 24-bit (read/write) offset, 4-bit CRC-4 error detection code and a 4-bit command. The main clocks of both AG rings are running nominally at 125 Mhz or 8 ns per clock cycle and are generated from the same clock sources CS for each AG ring (i.e. all AGs in the ring have the same clock sources, but this source is different for the two rings). In one clock cycle, therefore, one AG ring is able to transfer 32 bits through the 5 Gbps synchronization link to the other ring. The total time required to complete an offset update frame, therefore, is ((NumQueues/4)+NumSyncParameters+1)*8 nS. It takes four offset update frames to go over either read or write offsets of all queues; extended by saying that it takes 4+4+1=9 offset update frames to complete the entire synchronization.

Figure 11:
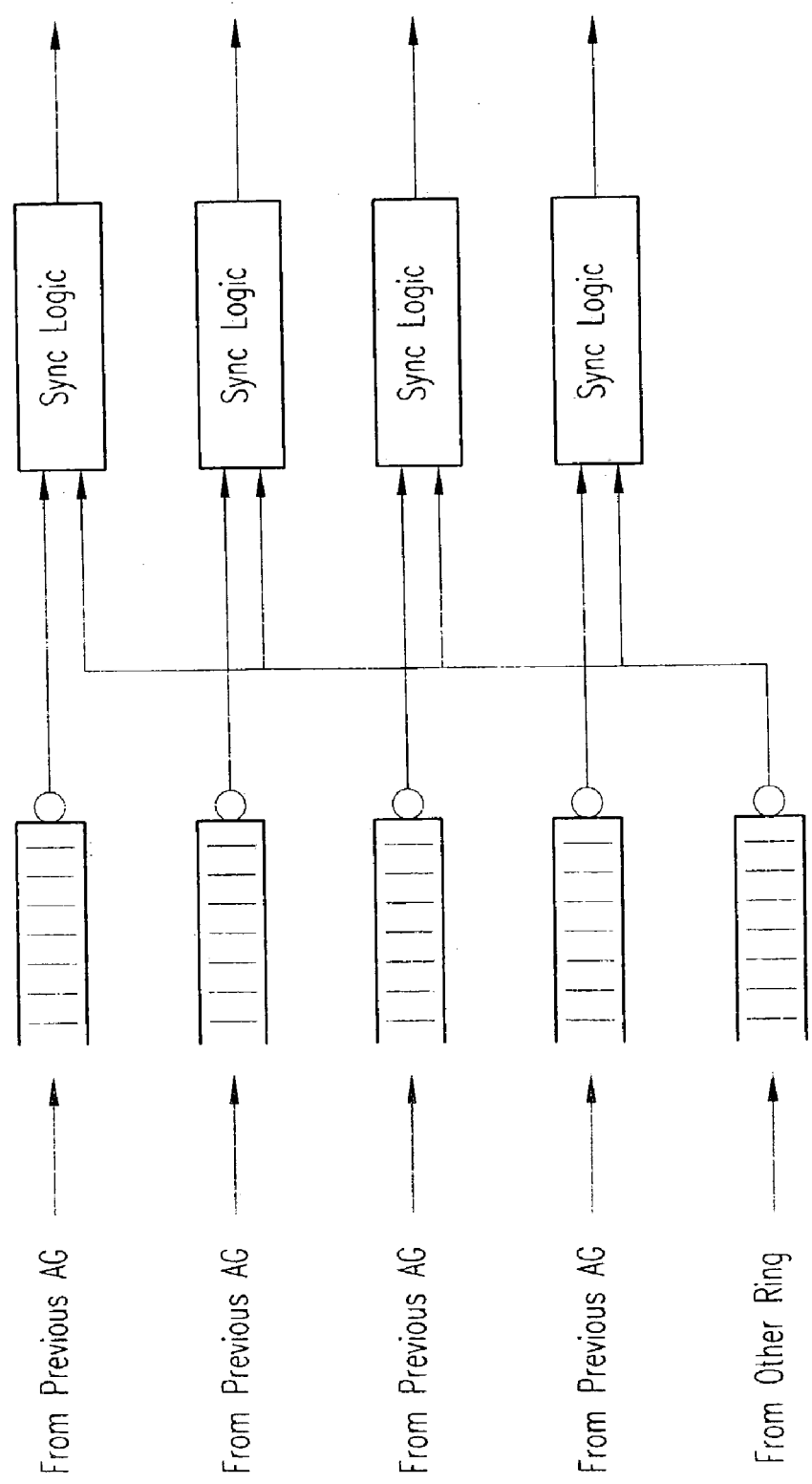
FIG. 11 is a synchronization logic block therefor.

To compensate for the latency introduced by the synchronization link, two sets of synchronous FIFO's are provided (schematically noted in the AG block of FIG. 1) on the input of an AG; one set of four FIFO's for offset from the previous AG and the second set consisting of a single FIFO for offset from the second or remote AG ring. An offset arriving on each link is stored in its appropriate FIFO; and when offsets are available on all FIFOs, they are dequeued. Depending on the operational mode of the ring and the relationship of the offset from the other ring and from the previous AG, either the offset from the previous AG or the other ring is used. This function is performed by the Sync Logic blocks shown in FIG. 11. Such a Sync Logic block has two operational modes-normal operation mode and synchronization mode. An AG ring is set to the synchronization mode only for a newly replaced BMP card or in an ESF booting procedure. As soon as two AG rings are synchronized, the AG ring (that is booting up) will transition into the normal operation mode.

Normal Operation Mode

In such a normal operation mode, AG-0 receives 4 offsets from AG-15 on the same ring, and one offset from AG-15 on the other ring. It then compares the offset from AG SyncLink to the corresponding offset in the Sync Logic block of FIG. 11. It takes four offset update periods to go over offsets of all queues. As mentioned earlier, moreover, the AG provides several direct and indirect means of detecting static errors. These kinds of errors require service and the local processor can be interrupted when any such error is detected; the software then shutting down the BMP card and scheduling it for manual service.

Transient errors, on the other hand, can be detected by the AG ring protocols because of the above-described CRC-4 protection. These errors can be corrected upon receiving the appropriate error-free read and write offset as a substitute from the other AG ring.

Five possibilities or "cases" may arise:

Case 1—read and write offsets from local and remote rings are both error-free and match with each other. This indicates that the two rings are synchronized with respect to the pertinent queue. In this case, the offset from the previous AG on the local ring is used to update local offset, and after adding this offset to the local accumulation the updated offset is pathsed along to the next AG.

Case 2—read and/or write offsets from local and remote rings are both error-free but they do not match each other. This indicates that the two AG rings are not synchronized. This is a valid condition only when one AG ring is in synchronization mode while the other is in normal operation mode, as otherwise, there is a serious malfunction—e.g. the two AG rings are differently initialized. In the latter case, the software has to take corrective action such as choosing a correct ring, but more likely, the ESF has to be essentially restarted. In the former case, the offset from the ring under normal operation mode will be used by the ring in synchronization mode. It should be noted, moreover, that when an AG is in later-discussed Synchronization Mode (relative to the pertinent queues) the address return command to a TM tells the TM to disregard the packet address from that AG, as earlier explained.

Case 3—read and/or write offsets from the previous AG on the local ring is error-free while the offsets from remote ring has CRC e previous AG will be used to update the local offset. It adds to the local accumulation of that queue and is pathsed to the next AG in the ring. The error offset from the other AG ring is simply discarded. A counter for this kind of error is suggested in an AG to help with system diagnostics.

Case 4—read and/or write offsets from previous AG on the local ring has a CRC error-free, while the offsets from the remote ring is error-free: In this case, the AG will use the offset from the remote ring to recover current ring from the error condition. The offset from the remote ring is used to update the local offset, and added with the local accumulation and then pathsed to next AG.

Case 5—read and/or write offsets from previous AG on the local ring as well as the offsets from the second or remote ring have errors: Both offsets have CRC error leading to invalidating of the local offset. Since the error could be introduced by the synchronization link itself, the AG does not take any action except record the error. Since the probability of two transient errors occurring at the same time on both rings and on the same queue is very low, this case is treated as a fatal error—most likely, a design error. System software will be notified of this condition, it must decide either to re-initialize the affected queues or the entire ESF, or request manual service to replace the BMP card.

Synchronization Mode

When an AG ring is in synchronization mode, all AGs on the ring are reset to initial state. It is assumed that all offsets start from AG-0. A synchronization command is sent to the other ring, awaiting the before-mentioned offset update frames. It should be noted that the TM sends incremental relative read offset update commands to the AG, such as the number of lines of cells read from the memory card. Since this is an incremental relative offset, the full relative offset is available with the AG ring in the normal mode previously described. In the synchronization mode, both the write and the read offsets are sent by the AG in normal mode to the AG in "Sync Mode".

The procedure is as follows:

1. The first offset updating frame starts with queue 0 and is used for synchronizing the inputs of SyncMode AG and any other synchronization that may be needed
2. After the first offset frame, the AG ring in normal operation mode starts transferring read offsets to the remote ring. The AG in Sync Mode receives the read offset, stores the offset into proper entry for the read offset table and activates that entry. After this, it allows a read offset update command from TM to modify it. Since the bandwidth to read transfer offset from one AG to another is four times that from one AG ring to another, it takes four offset update periods to transfer read offsets for all queues. At the end of four read offset update frames, the read offsets of the two rings are completely synchronized, as earlier described.
3. After completing the transfer of read offsets, the AG in normal mode begins to transfer write offsets starting with queue 0. In the meantime, the AG in Sync Mode operates just as it does normally—i.e. it adds the accumulated cell counter of corresponding queue to the offset and pathses the summation to next AG, as earlier detailed. The only difference is that it when it sends the new offset for the updated queues to the next AG, it marks the offset as "valid". Since the bandwidth to transfer offset from one AG to another is four times that from one AG ring to another, it takes four offset update periods to transfer write offsets for all queues. When all queues are thus updated, the AG Ring in Sync Mode will transition to normal operation mode. Any transient error during Sync Mode is marked by setting the invalid bit at corresponding offset table entry. Those offset will be corrected during normal operation mode later, and therefore, no additional action is necessary.

During this synchronization mode, the AG operates as in the normal operation mode, except all address returned to TMs are marked with invalid tag so that the TMs will ignore the addresses received. While it is clear how this mechanism works when one ring is in normal operation mode and the other in synchronization mode, when both AG rings are in synchronization mode, each of them sends a synchronization command to the other. Each AG ring will start the first offset frame as soon as it receives a synchronization command from the other ring. Both of the AG rings stay in synchronization mode for the next nine write offset periods, and the offsets that both of them send and receive are identical initial offset values. Then, both AG rings turn themselves into the normal operation mode detailed above.

TM Synchronization

During synchronization time of write offset, a packet could be dropped by a RED function in the AG under normal operation. In the AG ring under synchronization mode, however, there may be a different average queue size (and the seed for pseudo random generator) from the normal mode AG. That may lead to the two AG rings making different RED drop decision for the same packet, leading to loss of write offset synchronization for those queues. To avoid complexity in the design, the invention provides for the reset of all average queue sizes and the shut down of the RED operation during the synchronization mode (tail drop will continue normally). The RED operation will be resumed immediately after the synchronization procedure ends. An exemplary expected time during which the RED function is shut down may be about 30 µs, which is negligible.

To effect address request synchronization an AG accumulates data packets for a queue during a fixed time interval called the "ring period", which is determined by the number of queues that the system supports. This period for each queue is completely synchronous with the corresponding offset update period on the ring. Since the address requests from the TMs are asynchronous, and the time-skew from a TM to the two AGs may be different, the accumulation of packet sizes may be off by, at most, two packet sizes—one at the beginning and another at the end of an offset update period.

Figure 12:
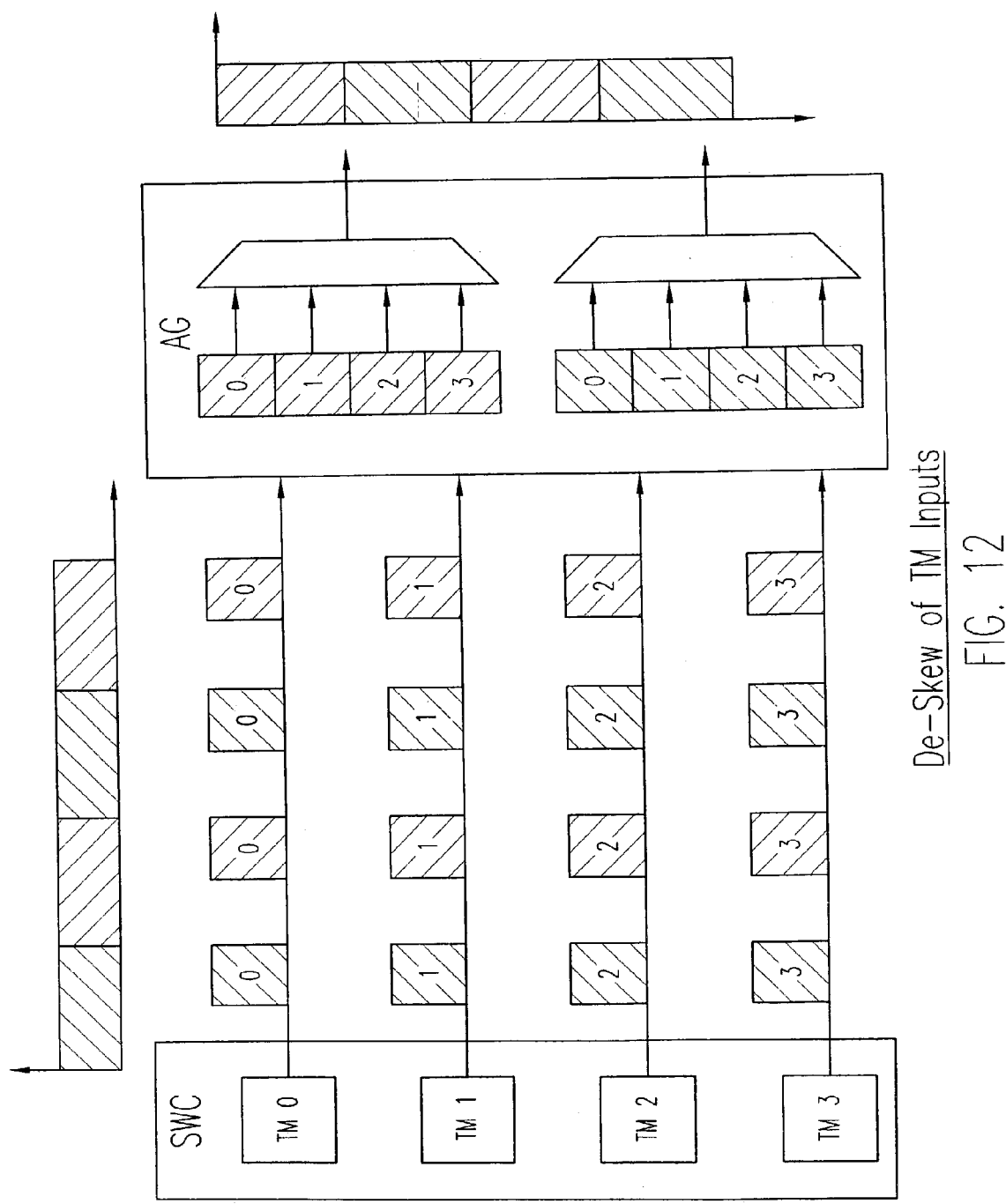
FIG. 12 is a diagram of the concept for the de-skewing of traffic manager TM inputs.

In the example previously given, in order to meet the line rate, a TM can send an address request every 32 nS. Given that the TM (and AGs) operate at 8 nS clock periods, on average, each TM is allowed to send one address request command every four clock cycles. The maximum skew from a TM to the two AGs of and among the TMs of FIG. 9, is less than one clock cycle. In order to insure that the two AGs connected to each TM (on the different rings) process the address request in the same super packet, the four TMs on the same switch card SWC are forced to send only one address request at the first clock cycle of every four-clock cycle group. FIG. 12 shows an AG receiving the address requests from four TMs (TM0–TM3) in the first two cycles of the corresponding input period since the skew is at most 8 nS. The AG will start processing these requests during the next input period, allowing two cycles of time buffering, or de-skewing. The following two issues should be noted in this mechanism:

Issue 1. Synchronization of four TMs on a switch card to an AG on one ring: Given that the TMs connected to an AG reside on the same switch card SWC, the latencies from different TMs on the same switch card to an AG, are very close. Each TM will maintain a 2-bit counter clocked at 8 nS; and the TM will send an address request to its AG only when this counter is zero—i.e. it will stall any request until this counter is zero. Essentially, by allowing this counter to be loaded with any value between 0–3, a sync signal is provided on each TM that determines when it can send an address request. Each TM initializes this counter, but either of the two AGs on different rings can send a new "load" value to the TM. This allows the AG to send a signal back to the TMs to justify the clock-cycle at which the TM sends its address requests. For instance, an AG receives read requests from TMs at time slots 0,0,0,1, respectively; it will then send a signal to TM3, and TM3 then will increase its counter by one in addition to the one every 8 nS).

Issue 2. Synchronization of AG-TM interfaces on both AG rings: It should be noted that, as earlier stated, to solve the first problem, each AG maintains a 2-bit de-skew counter for each TM. The AG-TM interfaces can be synchronized on both rings by sending a "mark" command over the SyncLink; i.e. when an AG gets the "mark" command, it will reset the TM de-skew counters.

For each 4-cycle period, thus, a TM is allowed to send an address request command to two AGs. There are two error detection mechanisms in the address request—the before-mentioned CRC code for the request, and a sequence number attatched to each command.

A TM has to send a NULL command to the AGs when there is nothing to send. It always attaches the latest sequence number of a meaningful command to such a NULL command to enable detection of whether a command is lost during transfer from a TM to AG. The loss of a non-NULL command, in turn, will result in the AG ring being in the synchronization mode.

Figure 13:
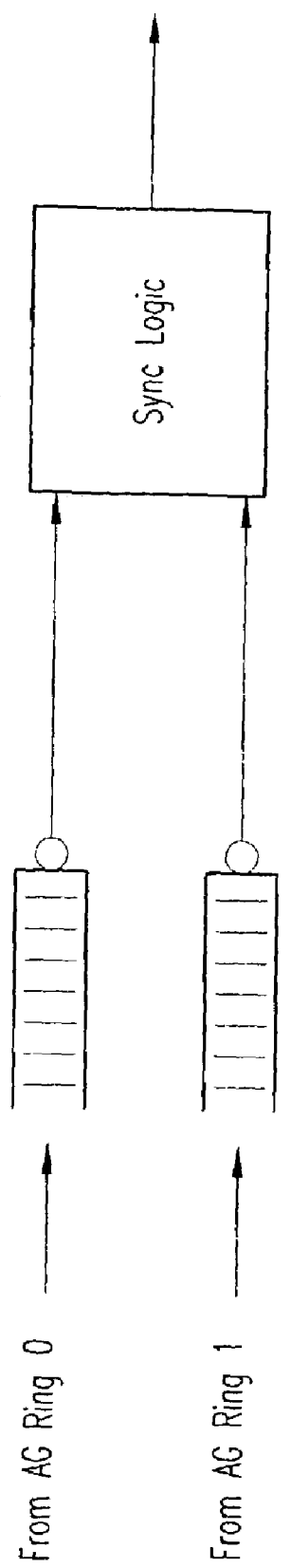
FIG. 13 is a diagram illustrating suitable return address arbitration logic at the traffic managers.

A TM receives addresses from two AGs resident on different AG rings as shown in FIG. 2 and also in FIG. 13. Returned addresses have to be in the same order. The received address and associated error detection code are temporarily stored in a corresponding FIFO. The return addresses selection logic of FIG. 13 determines which address to use and raises error signals under certain conditions. If both addresses are error free (no CRC error) and if both addresses are the same, the TM will pick one; but if they are different, the TM will raise an exception to the CPU to indicate that the two AG rings have lost synchronization. If only one of the two addresses is error free, the TM will use the one without error. If neither of the two addresses is correct, the TM will raise an exception to the CPU to indicate that a fatal error happened that requires either full reset of the AG rings or replacement of both address rings.

To prevent the loss of address on a link between a TM and the BMP card a sequence number may be periodically transferred from an AG to a TM. Each command must be attached with such a sequence number, and the most recent number is attached to a NULL command during the time that no return address has been transferred.

AG Ring Synchronization

The AG synchronization procedure is invoked after replacing a BMP card, or during an ESF booting procedure earlier discussed. After the procedure is completed, the two AG rings should then be in exactly the same state.

The first step of AG operation in ring synchronization, is synchronizing offset updating. After this step is finished, both rings should update the offset for the same queue in the same clock cycle, but with a time skew. This first step takes one "write" updating period.

The second step is "read" offset synchronization, wherein the working AG ring pathses the read offset (one at a time for each queue) to the other AG ring through the SyncLink. Read offsets received by the AG in Sync Mode are circulated to each AG on that ring. This step takes a minimum of four offset updating periods to finish read offsets of all the queues. It should be noted that once the read offset from the normal AG is received, the SyncMode AG uses the TM read updates to stay in sync with the normal AG, since both AGs are now receiving the same read update commands from their TMs.

The third step is the write offset synchronization, wherein the working AG ring pathses the write offset (one at a time for each queue) to the other AG ring through the SyncLink. The write offset received by the AG in SyncMode will be added with the accumulated cell counter of the corresponding queue, and then passed to the next AG. Again, this step requires four write pointer updating periods at minimum, to finish the write offset for all queues.

The AG Synchronization Procedure May Therefore be Tabulated as Follows:

1. The ring that is out of step, sends a SyncMode command to the other AG ring and then waits for the write offset updating frame header to be received.
2. The frame header received will set that AG into the ring synchronization procedure before-presorted; namely:
   a. the AG will initialize the TM de-skew counters in the AG, which will synchronize the offset updating period as well as the inputs from TM.
   b. The AG will now wait for the corresponding read offset updating period.

3. The next frame header received at the AG in Sync Mode will set that AG for receiving read offsets for one-quarter of the total queues starting with queue 0; namely,
   a. the AG will write the read offset to corresponding entry in the before-described read offset table and validate the entry; this will allow the subsequent (incremental relative) read offset update commands from TM to update the (relative) read offset.
   b. in the meantime, the AG will paths the read offset to the next AG, and during one read offset updating period, one fourth of the read offset will be transferred; and then
   c. the AG will now repeat this step-3 four times before all read offsets are synchronized.
4. The write offsets are transferred at the beginning of the next offset updating period, one per clock cycle; namely,
   a. the write offset is written into the write offset table.
   b. in the meantime, the AG adds the accumulated cell counter of the corresponding queue to the write offset and pathses it to the next AG, similarly to the write offset updating under the normal mode; and
   c. one fourth of the write offsets are transferred during one write offset updating period, with this step-4 being repeated 4 times.
5. Both rings will now be re-synchronized and the Sync Mode AG will set its mode to the normal operation mode above described.

As earlier noted, the above procedure works when one AG ring is in normal operation mode. When both rings are in synchronization mode, however, all read offsets and write offset that are pathsed to on another, are zeros.

From a more general viewpoint, the present invention thus provides a fault-tolerant address generating system for receiving address requests from a stream of successively clocked data packets, each provided with headers including error detection code facility; and, in the event that an incorrect or error data packet is detected, continuing the flow of the data packet stream while rejecting the incorrect data packet and substituting a correct data packet in the stream for the incorrect data packet and in real time.

The mechanism of the present invention for achieving this fault tolerance resides in the use of two data flow paths, illustrated as preferably in the form of identical rings of successively operated address generators, each clocked preferably, though not essentially, at substantially the same frequency, and independently and parallely receiving the data packets therealong from a common data packet source, such as common traffic managers receiving the same time card data. The rings are started off in synchronism with the traffic managers requesting identical address data source along each ring and receiving therefrom identical address responses. The rings are convergingly linked as at their opposite ends, such that when address data arrives from an address generator at the end of a ring, it is stored to await the corresponding address data from the corresponding address generator of the other ring for comparison. In the event that such address data from one of the rings is in error and thus different from that from the other ring, the erroneous address data is rejected and discarded while inserting the correct address data from the other ring in its place. The operation of the rings is then re-synchronized to enable continuation in real time of the flow of the stream of address data with the substitute correct address data.

While illustratively described in connection with the preferred closed ring data flow paths, the principles of the invention are more broadly useful, also, with other data packet flow paths, as well. Specifically, separate first and second identical packet data flow paths would again be provided, receiving identical streams of successive data packets and convergingly linked at intervals for comparing the corresponding data packets from each flow path at such links. In the event that one of the compared data packets of one of the flow paths has been determined by its error detection code to be in error, such erroneous data packet is discarded and the correct data packet of the other flow path is substituted therefore. The two flow paths are then re-synchronized at the convergence links to enable the continuation of an uninterrupted error-free stream of data packet flow following such convergence.

This technique of the invention thus obviates the before-mentioned prior art necessity to start over for error correction. While only two separate parallel data flow paths have been illustrated, moreover, clearly further pluralities of parallel paths may be similarly employed for providing such "on-the-fly" data error detection and correction features of the invention.

Further modifications will also occur to those skilled in this art, and such are considered to fall within the spirit and scope of the invention as defined in the appended claims.

What is claimed is:

1. In a system comprising two identical but independently operated parallel path closed rings of successively corrected and respectively clocked sequential data address generators, wherein a source of a stream of successively clocked data packets each provided with headers including error detection code facility flows along a first such path, a method of correcting data error in a packet and substituting therefor a correct data packet without interrupting the flow of the stream of data packets along said first path, that comprises, simultaneously flowing from said source a second identical stream of the successive data packets along a separate parallel second path;
   synchronizing the operation of said first and second data packet flow paths;
   at intervals along the separate data packet flows, convergingly linking the first and second flow paths at a common point of each of the respective rings and comparing the corresponding data packets from each flow path at such link point;
   in the event that one of the compared data packets of one of the flow paths has been determined by its error detection code to be an error, discarding such erroneous data packet and using the corresponding data packet of the other flow path in substitution therefore;
   and re-synchronizing the operation of the first and second data packet flow paths to continue an uninterrupted stream of data packet flow following such convergence.

2. The method of claim 1 wherein while the data packets may be clocked at the same frequency or at different frequencies along the first and second paths, the data flow therealong is at different speeds.

3. The method of claim 2 wherein the clocking frequencies are substantially the same and said different speeds are only slightly different.

4. The method of claim 1 wherein, the data packet of that path that arrives first at the convergence link point of the rings is stored until the arrival of the corresponding data packet of the other path; and then, if one of the data packets is an error, the correct data packet of the other path is released to continue the data packet flow; but if both data packets are correctly the same, they are both released in momentary synchronized release of stream flows along both separate paths.

5. The method of claim 1 wherein each data stream flow path comprises a cyclical routing of successive data information packets along a closed ring.

6. The method of claim 5 wherein said data packet information comprises address messages generated by successive address generators connected in the ring and receiving address requests from data stream line cards.

7. The method of claim 6 wherein said line cards are fed from a shared memory output-buffered switch fabric.

8. In an address generating system for receiving address requests for a stream of data packet headers received by a traffic manager, the method of generating a corresponding stream of address data, that comprises, providing two identical but independently operated closed rings of successively connected and clocked address generators;

synchronizing the operation of both address generator rings;

applying the same received stream of data packet headers from the traffic manager to each of the address generator rings successively to generate requests for identical address data along each address generator ring and to return to the traffic manager identical address responses;

linking the rings at a common convergence point at an end of each ring such that when address data arrives from an address generator at such end of the ring, it is stored to await the corresponding address data from the corresponding address generator of the other ring for comparison at said ring end point;

in the event that such address data from one of the rings is in error and thus different from the corresponding correct address data from the other ring, discarding the erroneous address data and inserting the correct address data from the other ring in its place; and re-synchronizing the operation of both rings to enable continual real-time flow of the stream of address data from said ring end point corrected to substitute the correct address data for the erroneous address data.

9. The method of claim 8 wherein the determination of the erroneous data is made through error detection code in said header.

10. The method of claim 8 wherein said synchronizing compensates for both address generator clocking frequency differences and timing skew, and for traffic manager address request a synchronism.

11. A fault-tolerance method for protecting against and for correcting errors in packet data stream flow, that comprises
applying the same packet data stream to each of a pair of independent parallel data flow path, each containing independently operated parallel closed rings of successively connected and respectively clocked sequential data address generators;
initially synchronizing the flow in the paths;
linking the paths at predetermined intervals at a common convergence point of the rings and comparing the corresponding data in each path at such ring linking points in order to detect a possible error in the data occurring in one of the paths;
substituting for such data error in one of the paths the corresponding correct data from the other path; and
re-synchronizing the flow in the paths to enable continuation of the data stream flow without interruption and without error.

12. The method of claim 11 wherein each path comprises an identical closed ring of sequential packet data address generators.

13. The method of claim 12 wherein said predetermined intervals are located at the ends of the closed rings.

14. An address generating system for receiving address requests for a stream of data packet headers received by a traffic manager, having, in combination, two identical but independently operated parallel closed rings of successively connected and respectively clocked sequential address generators;

means for synchronizing the operation of both sequential address generator rings;

traffic manager for applying the same stream of data packet headers to each of the address generator rings successively to generate requests for identical address data along each address generator ring and to return to the traffic manager identical address responses;

means for linking ends of the rings at a common convergence point such that when address data arrives from an address generator at an end of the ring, it is stored to await the corresponding address data from the corresponding address generator of the other ring for comparison at said point;

in the event that such address data from one of the rings is in error and thus different from the corresponding correct address data from the other ring, means discarding the erroneous address data and inserting the correct address data from the other ring in its place at said point; and means for re-synchronizing the operation of both rings to enable continual real-time flow of the stream of address data corrected to substitute the correct address data for the erroneous address data.

15. The system of claim 14 wherein an error detection code facility is provided in said header for making a determination of the erroneous data.

16. The system of claim 14 wherein the synchronizing means compensates for both address generator clocking frequency differences and timing skew, and for traffic manager address request a synchronism.

17. The system of claim 14 wherein said address request are from data stream line cards fed from a shared memory output-buffered switch fabric.

18. The system of claim 14 wherein the address generator ring synchronizing means enables each ring to be presented with an identical view of memory allocation to the extent that, for the same data packet, each ring assigns the same address in memory.

19. The system of claim 18 wherein means is provided for address request synchronizing of the traffic manager to each address generator ring to insure that each data packet is accepted by each ring in the same packet frame.

20. The system of claim 19 wherein said synchronizing is achieved both as to the two address generator rings and as to each traffic manager to both address generator rings, whereby both address generator rings produce the same data address for the same data packet.

21. The system of claim 14 wherein the address data storing is effected with FIFO units associated with the address generators.

22. The system of claim 14 wherein the traffic manager is adjusted to send an address request every 32 nS with the traffic manager and address generators being clocked at 8 nS periods on average, such that each traffic manager sends one address request in an input period of every four clock cycles.

23. The system of claim 22 wherein the traffic manager is adjusted to send an address request at the first clock cycle of every four-clock cycle input period.

24. The system of claim 23 wherein an address generator receiving such an address request receives the same in the first two cycles of said input period and is adjusted to process the requests during the next input period, allowing two cycles of time buffering or de-skewing.

25. The system of claim 23 wherein four traffic managers are provided for synchronization to an address generator on a ring, each provided with a 2-bit counter clocked at 8 nS, with the traffic manager sending an address request to each address generator when said counter is at zero and stalling any request until the counter is at zero.

26. The system of claim 25 wherein each address generator maintains a 2-bit de-skew counter for each traffic manager.

27. In a system comprising two identical but independently operated parallel path rings of successively connected and respectively clocked sequential data address generators, wherein a source of a stream of successively clocked data packets each provided with headers including error detection code facility flows along a first such path, apparatus for correcting data error in a packet and substituting therefor a correct data packet without interrupting the flow of the stream of data packets along said first path, having, in combination, means for simultaneously flowing from said source a second identical stream of the successive data packets along a separate parallel second path;

means for synchronizing the operation of said first and second data packet flow paths;

means located at intervals along the separate data packet flows, convergingly linking at a common point of each of said rings the first and second flow paths and comparing the corresponding data packets from each flow path at such link point;

in the event that one of the compared data packets of one of the flow paths has been determined by its error detection code to be an error, means for discarding such erroneous data packet and using the corresponding data packet of the other flow path in substitution therefore; and means for re-synchronizing the operation of the first and second data packet flow paths to continue an uninterrupted stream of data packet flow following such convergence at said point.

28. The apparatus of claim 27 wherein the data packets are clocked at the same frequency or at different frequencies along the first and second paths, while the data flow therealong is at different speeds.

29. The apparatus of claim 28 wherein the clocking frequencies are substantially the same and said different speeds are only slightly different.

30. The apparatus of claim 27 wherein storage means is provided for storing the data packet of that path that arrives first at the convergence link point until the arrival of the corresponding data packet of the other path; and then, if one of the data packets is an error, means is provided or enabling the corresponding correct data packet of the other path to be released to continue the data packet flow; but if both data packets are correctly the same; they are both released in momentary synchronized release along both separate paths.

* * * * *